Nov. 4, 1958
C. B. H. FELDMAN ET AL
2,859,405
DERIVATION OF VOCODER PITCH SIGNALS
Filed Feb. 17, 1956
2 Sheets-Sheet 1
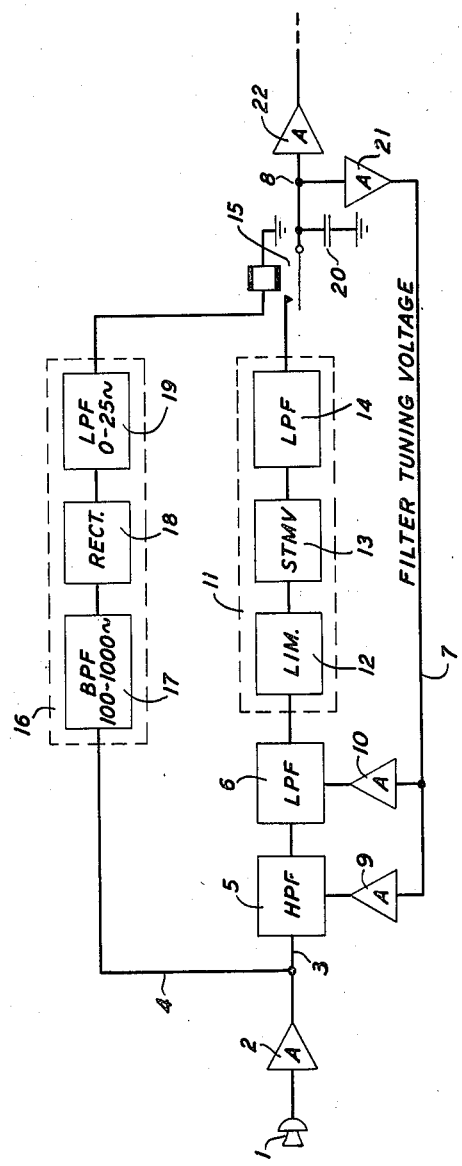
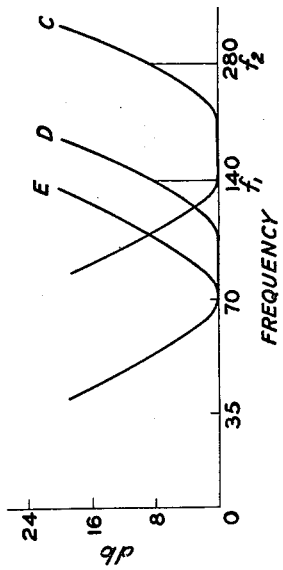
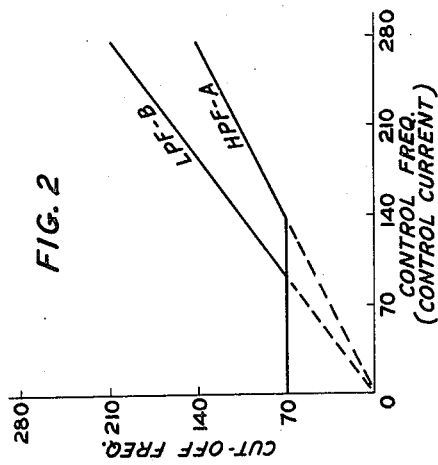
INVENTORS C. B. H. FELDMAN
A. C. NORWINE
BY
Harry C. Hart
ATTORNEY United States Patent Office 2,859,405
Patented Nov. 4, 1958

2,859,405

DERIVATION OF VOCODER PITCH SIGNALS

Carl B. H. Feldman, Summit, and Andrew C. Norwine, Short Hills, N. J., assignors to Bell Telephone Laboratories, Incorporated, New York, N. Y., a corporation of New York Application February 17, 1956, Serial No. 566,152

7 Claims. (Cl. 324—77)

This invention relates to electrical communication and particularly to the derivation from a complex signal such as speech of a significant index of its characteristics for transmission to a remote point where it may be utilized to control the reconstruction of the signal.

A primary object of the invention is to improve the accuracy and reliability of determinations of the fundamental frequency or pitch of a signal, e. g., a voice signal to be transmitted. A related object is to carry out such pitch determinations correctly even while the pitch itself is changing and, in particular, immediately after large changes in pitch.

Signal analyzing and synthesizing systems of the so-called "vocoder" type are well known wherein the information content of a signal such as a speech wave is extracted in the form of a number of slowly varying unidirectional currents or voltages which are then used to control the operation of synthesizing apparatus in reconstructing the original wave. Systems of this class form the subject of H. W. Dudley Patents 2,151,091 and 2,243,527, as well as other patents and publications.

For the reconstructed speech to have a natural and realistic character, it is essential in such a system to carry out an accurate determination of the fundamental frequency or pitch of the speech wave, to derive an unambiguous indication thereof for use as a control signal in the reconstruction apparatus, and to do so continuously.

In the past various approaches to this problem of pitch determination have been proposed. A common procedure has been to employ wave filter apparatus to segregate the fundamental component from all other components, and then to employ a frequency measuring device or meter such as a cycle counter to determine the frequency of the energy passing through the filter. Aside from modifications of detail, the output of the frequency meter has then been accepted as a measure of the voice pitch.

The construction of a reliable system of this character has always presented a difficult problem to the engineer. Many voices are so rich in harmonic components that the energy of the fundamental component is small in comparison with the harmonic energy, and is therefore difficult to segregate. Under some conditions the energy at the fundamental frequency disappears entirely and recourse is sometimes had to some indirect approach such as the inter-modulation of adjacent harmonic components, to derive a difference frequency. Aside from the complexities entailed, such difference frequency is a true measure of the voice pitch only in the case of a steady sound. The normal variations of frequency and of phase of the intermodulated components in the course of inflection causes such instantaneous frequency to be inadequate for the purpose.

In a sense the root of the difficulty lies in the fact that prior art systems have imposed two incompatible requirements on the pitch tracking filter. The first requirement is that its passband shall be sufficiently narrow to discriminate on the low frequency side against noise and on the high frequency side against harmonics. The second requirement is that the filter shall recognize the fundamental pitch component whenever it is present. When the filter is designed to meet the first requirement, and when it happens momentarily to be tracking the second or third harmonic of the speech it is quite insensitive to the return of the fundamental pitch component, which now lies outside of its field of view; i. e., below its passband. Hence it fails to meet the second requirement.

Previous attempts to determine the fundamental pitch through the action of a tracking filter have been subject to difficulties of two kinds. First, such a filter is generally unable to recover from a condition which results in selecting the wrong component. Second, it is subject to frequent needs to recover from false selection, giving momentary false indications of pitch.

A copending application of J. O. Edson and C. B. H. Feldman, Serial No. 566,153, filed February 17, 1956, points out that the first difficulty may be overcome by monitoring that part of the frequency range which lies below the frequency instantaneously being tracked, and, in particular, that part of it in which a temporarily vanished fundamental component is most likely to reappear. That application proposes, for carrying out the monitoring operation, an auxiliary tunable bandpass filter connected in parallel with the main tracking filter and tuned, fairly broadly, an octave below it. The auxiliary filter, with its own separate frequency meter, is thus at all times ready to recognize a component whose frequency is one-half that of the component being tracked or thereabouts; and provision is made, responsive to the reappearance of such a component within the band of the auxiliary filter, for tuning both filters downward on the frequency scale to such a point that the main filter again tracks the newly found component.

The present invention virtually eliminates the second type of difficulty mentioned and also provides a different solution to the problem of monitoring that part of the frequency range which lies below the component being tracked, and one which makes for a significant reduction in the complexity of the apparatus. This different solution employs, instead of two conventional bandpass filters connected in parallel, a single broad band filter having two independent tuning controls, one for its high frequency cut-off and the other for its low frequency cut-off. It may comprise, for example, a high-pass filter and a low-pass filter connected together in tandem, the adjustable low frequency cut-off of the one lying well below the adjustable high frequency cut-off of the other. The cut-off frequencies of these two filters are individually controlled by one and the same tuning control signal, which is preferably derived from the output terminal of the apparatus. Furthermore, the individual controls are so arranged that the responses of the two filters to the same control signal differ both in the rates at which their cut-off frequencies are shifted on the frequency scale and in the points of the frequency scale at which such shifts commence to take place. Of especial importance is the fact that the high-frequency cut-off of the low-pass filter stands in a ratio significantly less than unity, such as 0.75, to the control frequency which causes it, while the low-frequency cut-off of the high-pass filter stands in a ratio to the control frequency which is substantially less than the first ratio, and preferably about one half. By "cut-off frequency" is meant the frequency, within the passband, at which the flank of the loss-frequency characteristic is just about to commence to introduce noticeable loss.

With these arrangements, any component which is being steadily tracked lies above the upper cut-off frequency, at a point on the filter characteristic at which the filter introduces substantial loss. With this arrangement, upon the return of a temporarily absent component whose frequency is one-half or two-thirds that of the component being tracked, it reappears well within the pass band of the composite filter so that it is not significantly reduced in strength by the transmission loss of either filter.

In the event that the returning component is lower in amplitude than the tracked component and perfectly steady, no change in tuning results. But complex waves such as speech are habitually highly variable. Within a very short time after its reappearance the returning component usually exceeds the tracked component in magnitude, at least momentarily. When it does so, the frequency meter delivers a control signal which acts to tune both filters downward on the frequency scale. If this tuning action is very rapid the desired down-tuning to select the returning component may be completed on the first attempt. If tuning is more sluggish two effects come into play. First, the two components may alternately determine the frequency meter output, but their average value is necessarily less than that of the higher frequency component alone. Hence the filter is tuned to a somewhat lower frequency than that of the original tracked component. And second, because of the less-than-one-to-one tuning rule, each downward increment of tuning further attenuates the higher frequency component. Thus the prescribed tuning rule makes certain that the system cannot fail to tune downward to choose the fundamental, no matter how slowly or how rapidly the tuning operation may take place.

Thus a system constructed in accordance with the present invention recovers certainly and quickly from a condition in which tuning is correct for a harmonic rather than the fundamental. For simplicity, this may be referred to as recovering from a trouble condition. In certain arts such as vocoder transmission of speech it is equally important to minimize the occasions on which such a trouble condition can arise. This, too, is accomplished by the present invention, as will be clear from the following description.

During ordinary conversation a speaker's fundamental pitch frequently varies by as much as half an octave. Moreover a talker sometimes terminates a sentence with an exclamation whose pitch is a full octave higher than his normal pitch. In either of these cases a conventional tracking system tends to tune upwards on the frequency scale. On resumption by the talker at normal pitch his fundamental component may be attenuated by the selective filter and his second harmonic will certainly be attenuated less than desired for selection of the fundamental. It follows that the frequency meter will respond at least part of the time to the harmonic frequency, and the control signal which tunes the filter will correspondingly tend to raise the position of the filter response on the frequency scale. The critical question is whether this improper condition will be maintained, corrected or deteriorated by automatic tracking. With an exact one-to-one relationship between frequency and filter tuning this situation will most probably result in maintaining the trouble condition, while a greater-than-one-to-one relationship will almost certainly result in false tuning to a harmonic which then requires corrective action. This consideration has not been recognized in the prior art. By virtue of the less-than-one-to-one relationship of the present invention the situation just described does not result in false tuning to a harmonic but, to the contrary, causes the filter tuning to fall back to the correct fundamental pitch, and thereupon to track it. Thus the tuning rule not only results in quick recovery from a trouble condition, but it also guards against incipient difficulty degenerating into a trouble condition.

Between voiced sounds there is no pitch to be tracked. It has been determined from statistical examination of many speech sounds that when voicing returns after an interval of no voicing the most probable new value of the fundamental pitch frequency is near its most recent previous voiced sound value. Hence, provision is made to hold the filter tuning control signal at its latest value throughout each ensuing unvoiced interval. Such signal holding apparatus may be as described in an application of H. L. Barney, Serial No. 459,333, filed September 30, 1954 now matured into Patent No. 2,819,341, granted January 7, 1958.

The invention will be fully apprehended from the following detailed description of a preferred embodiment thereof taken in connecteion with the appended drawings, in which:

Fig. 1 is a schematic block diagram showing apparatus embodying the invention;

Figs. 2 and 4 are diagrams of assistance in the exposition of the invention.

Figure 3:
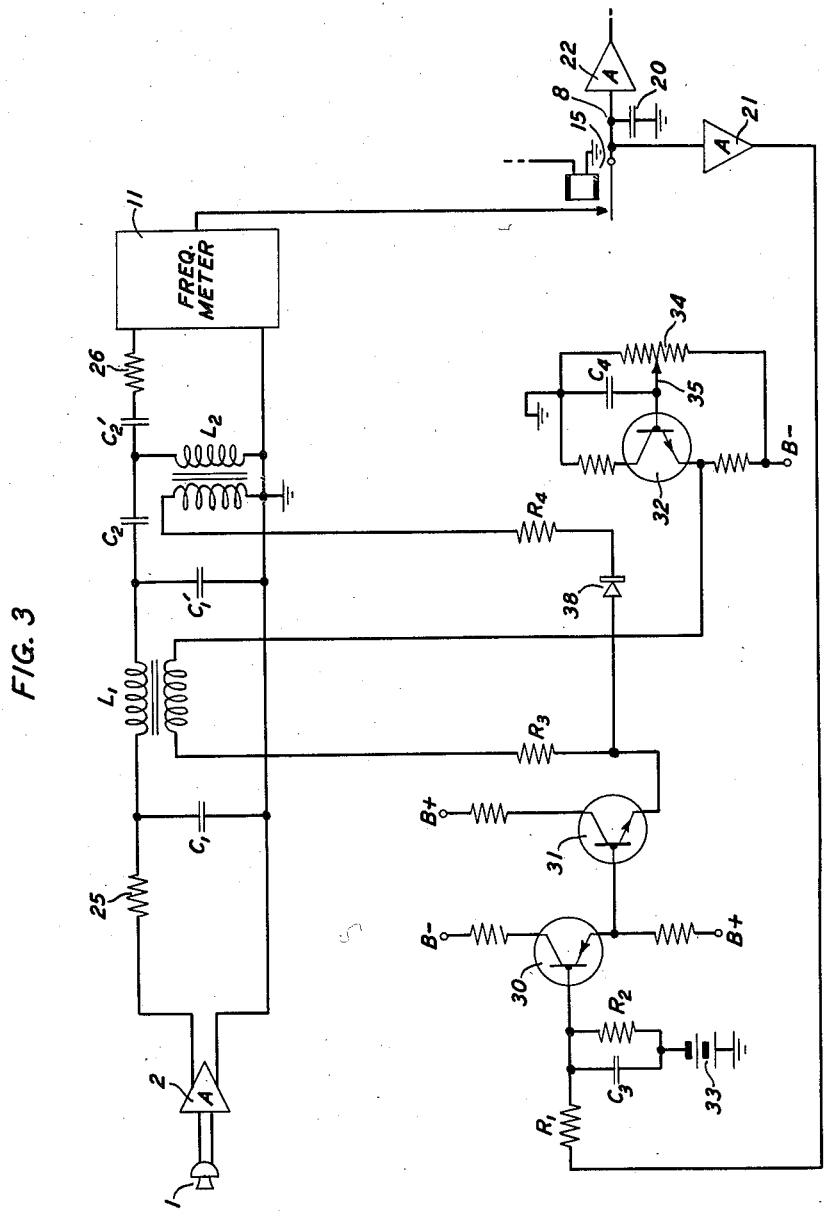
Fig. 3 is a schematic circuit diagram showing structural details of parts of the apparatus of Fig. 1.

Referring now to the drawings, Fig. 1 is a single line block diagram showing apparatus for carrying out the invention wherein a wave originating, for example, in a speech source such as a microphone 1 is applied by way of an amplifier 2 to a main forward path 3 and an auxiliary forward path 4. In the main forward path 3 a tunable high-pass filter 5 and a tunable low-pass filter 6 are connected in tandem, and provision is made for tuning these filters individually by a common tuning control signal on a conductor 7, derived from the output terminal 8 of the apparatus, the controls being isolated from each other as by buffers 9, 10. A frequency meter 11 is connected to the output terminal of the second filter 6. It may comprise the tandem combination of a limiter 12, a single trip multivibrator 13 and a low-pass filter 14 connected together in the order named. The output terminal of this frequency meter 11 is connected to the output terminal 8 of the apparatus by way of the contacts of a relay 15 which are arranged to be closed, and so to establish the connection, for voiced sounds and to be open for unvoiced sounds. To this end, the auxiliary path 4 includes a voicing indicator 16 which may comprise a bandpass filter 17, proportioned to pass frequencies in the range 100–1,000 cycles per second, a rectifier 18 and a low-pass filter 19 proportioned to pass components in the frequency range 0–25 cycles per second, connected together in the order named. The output terminal of this voicing indicator 16 is connected to the winding of the relay 15 thus to energize it and so establish the path from the frequency meter 11 to the output terminal 8 of the apparatus when the incoming sounds are voiced and not otherwise. During the progress of each unvoiced sound, while the relay contacts are open, the latest voiced sound value of the pitch signal is retained without change, as by storage on a condenser 20. Discharge of the condenser 20 while the contacts of the relay 15 are open may be prevented by inclusion of buffers 21 and 22.

In accordance with the invention, the responses of the two filters 5, 6 differ both in the rates of change of their cut-off frequencies with the control signal and in the points of the frequency scale at which these changes commence. They have, however, one important feature in common, namely, that the rates of change of their cut-off frequencies with the control signal, while they differ from each other, are both less than unity. In Fig. 2 the curve A shows the fashion in which the low frequency cut-off of the high-pass filter 5 changes with the control signal and the curve B shows the fashion in which the high frequency cut-off of the low-pass filter 6 changes with the same control signal.

The characteristics of Fig. 2 may readily be obtained with a circuit such as that schematically shown in Fig. 3. Here two filters are connected in tandem between the microphone amplifier 2 and the frequency meter 11. The first is a low-pass filter comprising a series inductor $L_1$ and two shunt condensers $C_1$, $C_1'$. The second is a high-pass filter comprising a shunt inductor $L_2$ and two series condensers $C_2$, $C_2'$. If desired, these two filters may be isolated by the interposition of a buffer between them, but the small amount of coupling which results from the circuit as shown is of some advantage in the adjustment of the bias currents to be described. Each of the coils $L_1$, $L_2$ is wound on a ferromagnetic core on which is also wound an auxiliary winding for carrying a control current to bias the core magnetically as described below. In the absence of the control current the "unbiased" magnitude of each of these inductors may appropriately be about 8 henries. The magnitudes of the condensers are then selected in the light of these inductance values to adjust the unshifted cut-off frequencies of the two filters to desired values, as shown in Fig. 2.

Resistors 25, 26 are included ahead of the first filter and following the second filter to adjust the transmission loss of the composite filter above the passband and the flatness within the passband. These resistors include the impedances ordinarily associated with input and output amplifiers. If such amplifiers are used they should present nearly zero impedance to the filter, or the resistances may be reapportioned between the filters and the amplifiers. The impedances are not critical. With element values as given approximately in the following tabulation, these filters afford loss frequency characteristics having slopes of about 20 decibels per octave:

$$L_1 = L_2 = 8 \text{ henries (unbiased)}$$

$$C_1 = C_1' = 1 \text{ microfarad}$$

$$C_2 = C_2' = 0.4 \text{ microfarad}$$

$$R_{25} = R_{26} = 3000\text{-}4000 \text{ ohms}$$

The feedback control current which shifts the cut-off frequencies may be applied to the control windings of the coils $L_1$ and $L_2$ by way of an amplifier. This amplifier may conveniently comprise two tandem connected transistors 30, 31 each having the conventional emitter-follower configuration. To adjust potentials and polarities in a convenient fashion, one of these may be an N-type transistor and the other may be a P-type transistor. This transistor pair, connected in this fashion, constitutes an amplifier having an effective current multiplication factor exceedingly close to unity and it therefore has excellent decoupling properties. Furthermore, it is insensitive to variations in the characteristics of the transistors themselves such as may result from temperature changes.

The feedback control signal is applied in combination with the bias of a potential source 33 to the first transistor 30 by way of a network comprising a resistor $R_1$ in series and the shunt-connected combination of another resistor $R_2$ with a condenser $C_3$. The function of this network is to prevent sudden changes in the control currents as applied to the inductors $L_1$ and $L_2$. Such sudden changes, if present, would alter the phases of signals transmitted through the filters and would thus impart roughness to the pitch control signal output of the apparatus. This, in turn, would make for roughness of the reconstructed speech at a receiver station. A suitable time constant for the network $R_1$, $R_2$, $C_3$ is fifteen milliseconds.

The current output of this transistor amplifier is passed by way of a resistor $R_3$ through the control winding of the coil $L_1$ to a point of appropriate fixed potential. The selection of the potential of this point determines the point of the frequency scale at which current first starts to flow through the control winding of the coil $L_1$, and therefore the frequency at which the tuning of the low-pass filter 6 commences to shift. To help maintain the desired relation between tuning and feedback signal as well as to prevent undesired coupling to miscellaneous energy sources, the point to which this control winding is returned should be a point of very low impedance. A low impedance point of controllable potential is readily provided by an auxiliary transistor 32 connected as an emitter-follower. Adjustment of the emitter potential is readily secured by connecting its base electrode to an appropriate point of a voltage divider resistor 34 as by a movable tap 35. A large capacity bypass condenser $C_4$ is included merely for decoupling purposes.

To adjust the control circuit in order that the cut-off of the low-pass filter shall commence to shift at a frequency of, say, 100 cycles per second, it is only necessary to determine the emitter potential of the second transistor 31 for a control signal representing this frequency, and then to adjust the movable contact 35 to such a point of the voltage divider 34 that the potential of the emitter electrode of the third transistor 32 has the same value. With this adjustment the second transistor 31 is cut off for all frequencies below 100 cycles per second. As the feedback control signal increases from an initial negative value determined by the bias battery 33, so does the emitter potential of the second transistor 31. When the feedback control signal has reached a magnitude representative of 100 cycles per second, current starts to flow through the control winding of the coil $L_1$, and flows in increasing quantities as the control signal increases, thus reducing the inductance of the coil $L_1$ and raising the cut-off frequency of the low-pass filter. The rate at which cut-off frequency changes with control signal is readily determined by the magnitude of the resistance in the circuit of the control winding; namely, the resistance of the winding itself, and the padding resistor $R_3$.

Control of the inductance of the coil $L_2$ of the high-pass filter 5 takes place similarly. Current commences to flow and the cut-off frequency of this filter commences to shift on the frequency scale when the potential of the emitter of the second transistor 31 exceeds that of the point to which the control winding is returned. This point may well be the emitter terminal of a bias-adjusting transistor circuit like that of the auxiliary transistor 32 described above. When, however, the designer has freedom to choose the emitter potential of the second transistor 31, as by adjustment of the potential sources B⁻ and B⁺ from which the first and second transistors 30, 31 are operated and of the bias potential source 33, the return point of the control winding of the coil $L_2$ may be preselected at any desired value. To simplify the apparatus this potential is shown as having been preselected at the value zero and accordingly, the control winding of the coil $L_2$ is shown as being returned to ground.

With the potentials shown, the point at which control current first starts to flow in the control winding of the coil $L_2$, and therefore the point at which the cut-off frequency of the high-pass filter 5 commences to shift, is 140 cycles per second. As with the low-pass filter 6, the rate at which the cut-off frequency of the high-pass filter 5 changes with the control signal beyond this threshold frequency is determined by adjustment of the series resistance of the control circuit, in particular the resistor $R_4$.

A diode rectifier 38 is included in series with the control winding of the coil $L_2$ merely to prevent the flow of currents in the reverse direction, which might otherwise take place when the emitter of the second transistor 31 is at a negative potential with respect to ground.

Isolation of each control signal from the other is sufficiently accomplished, in the apparatus by Fig. 3, by the resistors $R_3$ and $R_4$ and the rectifier 38. These elements therefore play the parts of the buffers 9, 10 of Fig. 1.

Fig. 4 shows the composite filter characteristics resulting from the combination of the characteristics of Fig. 2 for three different conditions. Curve C is the characteristic for a pitch frequency of 280 cycles per second, D is for 140 cycles per second and E is for any pitch frequency lower than 100 cycles per second.

The manner in which the apparatus of Figs. 1 and 3 exhibits the behavior depicted in Figs. 2 and 4 and so accomplishes the objects of the invention will now be readily understood. Suppose, for example, that the frequency meter 11 recognizes as the major voice component one whose frequency is $f_2$ as shown in Fig. 4. If this happens to be the fundamental component, lower frequency components such as $f_1$ are absent, and the output of the frequency meter is proportional to $f_2$, unmasked by other components. The feedback of this output to the control points of the filters 5, 6 enables them to track this component. However, because the shift of each cut-off frequency bears a less-than-one-to-one relation to a corresponding change in the control signal, tracking takes place at the upper flank of the loss characteristic of the composite filter where, as illustrated in Fig. 4, the filter introduces about 8 decibels of loss. Despite the introduction of this loss the control signal can easily be made sufficiently strong to carry outs its assignment, and tracking of the component $f_2$ as it shifts about on the frequency scale takes place in this fashion.

Suppose, however, that the component $f_2$ is a second harmonic and that the fundamental frequency component returns after a temporary absence. Its frequency is one-half of $f_2$ and is indicated in Fig. 4 as $f_1$. It appears within the passband of the composite filter at such a position that the low frequency flank of the characteristic of the high-pass filters interposes much less loss to it than does the high frequency flank of the characteristic of the low-pass filter 6 to the tracked component.

Because the relation of fundamental to harmonic amplitudes in speech is highly variable, the mixture of this returning fundamental component with the original tracked component is highly variable. First one, then the other component is the stronger from instant to instant. The frequency meter 11 recognizes this condition and provides an output which fluctuates between an order for the filters 5, 6 to remain fixed and another order to tune to a lower frequency. Thereupon the filters 5, 6 start to tune to lower frequencies. As soon as the slightest change in tuning takes place, the less-than-one-to-one rule results in an increased loss to the higher frequency component and, in some cases, a reduced loss to the lower frequency component, which increases the downward tuning tendency. Hence the process, once started, gathers momentum, and the cut-offs of both filters 5, 6 are rapidly tuned downward on the frequency scale until the originally tracked component $f_2$ is completely obscured, leaving the newly found component $f_1$ at full strength within the passband. Again, because of the less-than-one-to-one relation between controlled cut-off frequency and controlling signal, this down tuning continues further and until the newly found component $f_1$ is again located at the upper edge of the passband of the composite filter, where it introduces some loss in an amount sufficient to permit ready recognition of a component of still lower frequency, should such a component appear, but insufficient to disable the feedback loop.

These retuning operations take place in much less time than it takes to describe them. The complete operation frequently takes place in about $\frac{1}{10}$ second. Only in rare cases does it occupy as much time as three or four syllables of speech.

If the momentarily tracked component happens to be a third harmonic then, when the fundamental and the second harmonic return, the input to the frequency meter 11 is a highly variable mixture of the tracked third harmonic with one or both of the other two. As before, the frequency meter output fluctuates between an order for the filter to remain fixed and another order to tune downward on the frequency scale. Thus the filter must start to tune downward. As before, it gathers momentum as soon as it starts, and continues, at least until the second harmonic is tracked on the upper flank of the passband and, as long as the fundamental is present, it continues on beyond this point until, finally, the fundamental is tracked at the upper edge of the composite passband.

Thus the system not only recovers rapidly from any improper tracking condition into which it may have fallen but, in addition, is far less subject to falling into such a condition than are other known systems.

What is claimed is:

1. Apparatus for tracking the fundamental frequency component of a complex wave of varying frequency in the presence of harmonic components of said wave, which comprises a tunable bandpass filter having an input terminal, an output terminal and a tuning control terminal, means for applying said complex wave to said input terminal, means connected to the output terminal of said filter for deriving a control signal representative of the frequency of wave energy transmitted through said filter, and means for feeding back said control signal to the control terminal of said filter in a sense to shift the midband frequency of said filter on the frequency scale in a less-than-one-to-one relation with said control signal, whereby the major part of the passband of said filter always lies below the frequency of the component momentarily being tracked by said filter.

2. Apparatus for tracking the fundamental frequency component of a complex wave of varying frequency in the presence of harmonic components of said wave, which comprises a tunable bandpass filter having an input terminal, an output terminal and a tuning control terminal, said filter being proportioned to pass a band of frequencies of the order of one octave in width, means for applying said complex wave to said input terminal, means connected to the output terminal of said filter for deriving a control signal representative of the frequency of wave energy transmitted through said filter, and means for feeding back said control signal to the control terminal of said filter in a sense to shift the midband frequency of said filter on the frequency scale in a less-than-one-to-one relation with said control signal, whereby the passband of said filter always lies below the frequency of the component momentarily being tracked by said filter.

3. Apparatus for tracking the fundamental frequency component of a complex wave of varying frequency in the presence of harmonic components of said wave, which comprises a tunable bandpass filter having an input terminal, an output terminal and a tuning control terminal, said filter being proportioned to pass a band of frequencies of the order of one octave in width, means for applying said complex wave to said input terminal, means connected to the output terminal of said filter for deriving a control signal representative of the frequency of wave energy transmitted through said filter, means for feeding back said control signal to the control terminal of said filter in a sense to shift the midband frequency of said filter on the frequency scale in a less-than-one-to-one relation with said control signal, whereby the upper flank of the loss characteristic of said filter tracks a major component of wave energy transmitted through said filter, and means responsive to appearance of a different component within said passband and near the lower cut-off frequency thereof for further tuning said filter downward on the frequency scale to such a point that said first-named component is excluded from said passband, whereupon said upper flank of said filter tracks said different component.

4. Apparatus for tracking the fundamental frequency component of a complex wave of varying frequency in the presence of harmonic components of said wave, which comprises a tunable bandpass filter having an input terminal, an output terminal, a first tuning control terminal for varying its upper cut-off frequency and a second tuning control terminal for varying its lower cut-off frequency, said filter being proportioned to pass a band of frequencies of the order of one octave in width, means for applying said complex wave to said input terminal, means connected to the output terminal of said filter for deriving a control signal representative of the frequency of wave energy transmitted through said filter, means for deriving two separate bias currents from said control signal, means for applying one of said bias currents to the upper cut-off control terminal of said filter in a sense to shift said upper cut-off on the frequency scale in a less-than-one-to-one relation with said control signal, whereby the upper flank of the loss characteristic of said filter tracks a major component of wave energy transmitted through said filter, means for applying the other of said bias currents to the lower cut-off control terminal of said filter in the same sense to shift said lower cut-off on the frequency scale in a fashion to maintain said octave bandwidth relation, and means responsive to appearance of a different component within said passband and near the lower cut-off frequency thereof for shifting the midband frequency of said filter downward on the frequency scale to such a point that said first-named component is excluded from said passband, where upon the upper flank of the loss characteristic of said filter tracks said different component.

5. Apparatus for tracking the fundamental frequency component of a complex wave of varying frequency in the presence of harmonic components of said wave, which comprises a tunable high-pass filter and a tunable low-pass filter connected in tandem, each of said filters having a tuning control terminal, said filters being proportioned to embrace between their cut-offs a band of the order of one octave in width, means for applying said complex wave to the input terminal of the first of said filters, means connected to the output terminal of the second of said filters for deriving a control signal representative of the frequency of wave energy transmitted through said band, means for feeding back said control signal to the control terminal of said low-pass filter in a sense to shift its cut-off on the frequency scale in a less-than-one-to-one relation with said control signal, whereby the flank of the loss characteristic of said low-pass filter tracks a major component of wave energy transmitted through said filter, means for also feeding back said control signal to the control terminal of said high-pass filter in a sense to shift its cut-off upward on the frequency scale in a fashion to maintain said octave relation, and means responsive to appearance of a different component above and near the cut-off of said high-pass filter for shifting the cutoff frequencies of both of said filters downward on the frequency scale to such a point that said first-named component is excluded from said octave band, whereupon the flank of the loss characteristic of said low-pass filter tracks said different component.

6. Apparatus for tracking the fundamental frequency component of a complex wave of varying frequency in the presence of harmonic components of said wave, which comprises a tunable bandpass filter having an input terminal, an output terminal and a tuning control terminal, said filter being proportioned to introduce loss of the order of 20 decibels per octave measured in either sense from an adjustable mid-band frequency, the passband of said filter being thus one octave in width between 10 decibel loss points of the filter characteristic, means for applying said complex wave to said input terminal, means connected to the output terminal of said filter for deriving a control signal representative of the frequency of the strongest component of wave energy transmitted through said filter, and means for feeding back at least a part of said control signal to the control terminal of said filter, thereby to adjust the mid-band point of said filter to a fraction, between ½ and 1, of the frequency of said transmitted wave energy, whereby said filter tracks that one of a series of harmonically related frequency components of significant strength which is of lowest frequency.

7. In a system for analyzing speech sounds, in combination with apparatus as defined in claim 1 for tracking a harmonic component of a speech sound and for deriving a control signal that is representative of the frequency of said component, said component vanishing in the case of unvoiced sounds, means responsive to the voiced-unvoiced character of a sound for holding said control signal, throughout the duration of each unvoiced sound, at its most recent previous voiced sound value.

References Cited in the file of this patent

UNITED STATES PATENTS 2,051,364   Braden _____ Aug. 18, 1936